United States Patent
Noh et al.

(10) Patent No.: US 8,820,190 B2
(45) Date of Patent: Sep. 2, 2014

(54) ACTIVE ECO PEDAL APPARATUS

(75) Inventors: Jong-Sang Noh, Ulsan (KR); Jung-Yeol An, Ulsan (KR); Jong-Man Lee, Yangsan-si (KR); Jong-Geun Cha, Ulsan (KR); Mo-Se Kim, Ulsan (KR)

(73) Assignee: DH Holdings Co., Ltd., Ulsan (KR)

( * ) Notice: Subject to any disclaimer, the term of this patent is extended or adjusted under 35 U.S.C. 154(b) by 112 days.

(21) Appl. No.: 13/475,653

(22) Filed: May 18, 2012

(65) Prior Publication Data

US 2012/0304799 A1 Dec. 6, 2012

(30) Foreign Application Priority Data

May 30, 2011 (KR) .................. 10-2011-0051582

(51) Int. Cl.
G05G 1/30 (2008.04)

(52) U.S. Cl.
USPC ............................................. 74/512

(58) Field of Classification Search
USPC .......................................... 74/512, 513, 560
See application file for complete search history.

(56) References Cited

U.S. PATENT DOCUMENTS

| | | | | |
|---|---|---|---|---|
| 4,675,563 A | * | 6/1987 | Goldowsky | 310/15 |
| 4,945,269 A | * | 7/1990 | Kamm | 310/15 |
| 5,903,069 A | * | 5/1999 | Hiterer | 310/15 |
| 6,848,256 B2 | * | 2/2005 | Oshimo | 60/545 |
| 7,631,574 B2 | * | 12/2009 | Leone | 74/513 |
| 8,056,440 B2 | * | 11/2011 | Choi | 74/512 |
| 8,312,789 B2 | * | 11/2012 | Beck | 74/513 |
| 8,378,531 B2 | * | 2/2013 | Noh et al. | 310/12.04 |
| 2004/0003675 A1 | | 1/2004 | Brock | |
| 2008/0258567 A1 | * | 10/2008 | Mukaide | 310/12 |

FOREIGN PATENT DOCUMENTS

| | | |
|---|---|---|
| DE | 69220482 T2 | 2/1998 |
| DE | 69716458 T2 | 8/2003 |
| DE | 10310460 B3 | 8/2004 |
| EP | 1720727 B1 | 11/2006 |
| JP | 1996-116658 A | 5/1996 |
| JP | 2002-199690 A | 7/2002 |
| JP | 2003-291682 A | 10/2003 |
| JP | 2004-224190 A | 8/2004 |
| JP | 2010268672 A * | 11/2010 |
| JP | 2010-279162 A | 12/2010 |
| JP | 2011-118868 A | 6/2011 |
| JP | 2012-108866 A | 6/2012 |

OTHER PUBLICATIONS

German Patent Office Action for German Patent Application No. 102012104591.7 which corresponds to the above-identified U.S. Application.

* cited by examiner

Primary Examiner — Vicky Johnson
(74) Attorney, Agent, or Firm — LRK Patent Law Firm

(57) ABSTRACT

An active eco pedal apparatus with an the actuator which includes a VCM having a pair of first and second coils through which a current flows in opposite directions, and a pair of first and second magnets interacting with the electric field generated by the pair of the first and second coils, in which additional repulsive force is generated from the VCM supplied by the current, in addition to basic moving forces, thereby increasing thrust to push a pedal and thus remarkably improving the efficiency of an eco mode, in which since the actuator is controlled in a single-phase manner by a single-phase driver chip without using a hall sensor having high error possibility, it is possible to improve the reliability of operation, and in which since the number of FETs is reduced, the system is configured to have a compact size, and costs are lowered.

2 Claims, 8 Drawing Sheets

⊗ : Current IN
⊙ : Current OUT

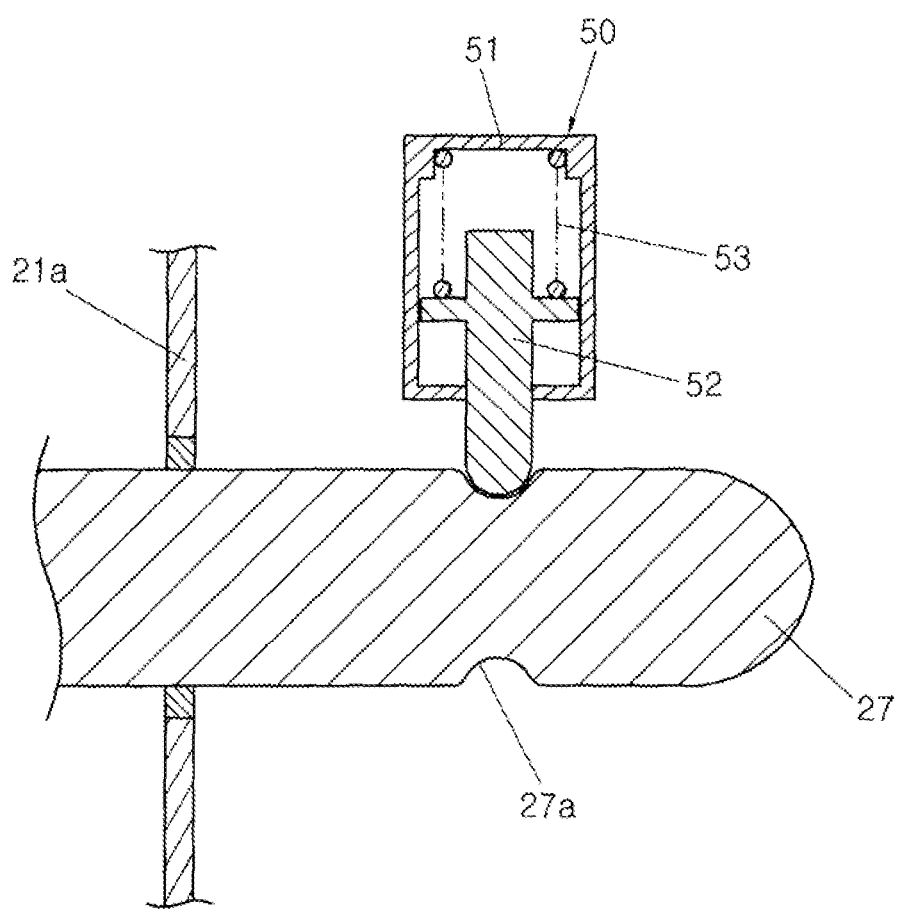

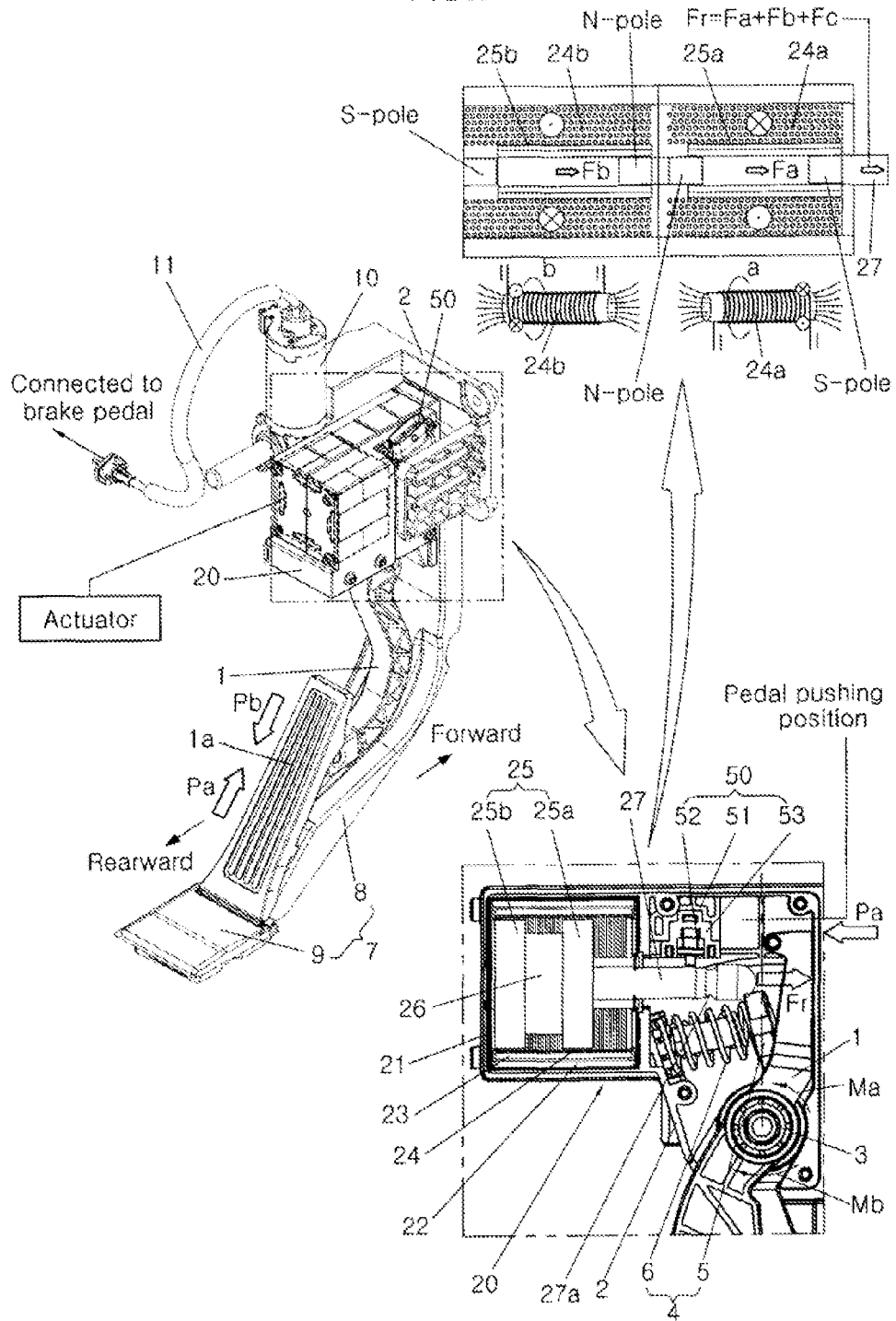

Graph of stepping force of pedal module

Graph of stepping force of pedal module

ACTIVE ECO PEDAL APPARATUS

CROSS-REFERENCE(S) TO RELATED APPLICATIONS

This application claims priority to Korean Patent Application No. 10-2011-0051582, filed on May 30, 2011, which is incorporated herein by reference in its entirety.

BACKGROUND OF THE INVENTION

1. Field of the Invention

Exemplary embodiments of the present invention relate to an accelerator pedal and/or brake pedal for a vehicle and, particularly, to an active eco pedal apparatus which can control ON/OFF of a pedal in a single-phase control manner to eliminate a factor contributing to increasing its costs, and can eliminate cogging torque to prevent deterioration of a pedal feeling when an eco mode is activated.

2. Description of Related Art

Among various methods of improving fuel efficiency of vehicles, a method of reducing unnecessary manipulation of a pedal is widely known.

As one example of the method of reducing the unnecessary manipulation of the pedal, there is a method of reducing the number of manipulation of an accelerator pedal, in which an operation mode is set to allow a driver to feel a different stepping force depending upon driving conditions. That is, the driver stepping on the accelerator pedal feels absolutely different pedal reaction to reduce the number of manipulation of the accelerator pedal.

This operation mode is generally referred to as an eco mode, and a pedal employing the eco mode is referred to as an eco pedal.

That is, the pedal reaction felt by the driver in a normal mode is provided by a resilient deformation of a spring, while in the eco mode the drive stepping on the pedal is provided with another reaction generated from a separate power source when a specific driving condition of the vehicle is satisfied.

In the eco mode, since the driver feels the pedal reaction different from that provided by the spring, the driver reduces the number of the unnecessary manipulation of the accelerator pedal, thereby improving the fuel efficiency.

As one example of the eco pedal capable of allowing the driver to feel the separate reaction, there is a power method employing an actuator. In this instance, a common PMDC type motor is utilized, and the power of the motor is converted through a reduction gear including a worm gear and a worm wheel to activate the eco mode.

In the case of the PMDC type motor, however, since the reduction gear is inevitably employed between a motor and a pedal to transmit the power, it has a quality problem caused by the high loss of power transmission and a problem of operational noise generated by a complicated power transmitting path.

Meanwhile, if a linear type motor is applied to the actuator, it is possible to remarkably improve the above-problems contained in the PMDC type motor, that is, the high loss of power transmission and the operational noise generated by the complicated power transmission path.

The reason is that since the power is transmitted by a magnetic field generated from the linear type motor, there is no loss of power transmission and no operational noise generated by the operation of the reduction gear.

As compared with the PMDC type motor, the linear type motor improves the quality, without generating the operational noise, as well as improves the accuracy of the operation.

As described above, the eco mode is a manner of providing the driver with the pedal reaction against the stepping force generated when the driver pushes down the pedal.

To this end, the linear type motor includes a movable member which is linearly moved with respect to a stator using the electric field generated when the current is supplied to the motor. Since the pedal is pushed by the movable member, the driver stepping on the pedal feels another reaction, so that the driver can take his or her foot off the accelerator pedal.

If the motor is controlled in a three-phase control manner, the motor should have a three-phase driver chip for driving the motor, a field effect transistor (FET) for detecting an overload of the current applied to the motor, and a hall sensor having a hall element for detecting a stroke of the motor.

Therefore, since the eco pedal utilizing the linear type motor which is controlled in the three-phase control manner is provided with the three-phase driver chip, a plurality of FETs, and a plurality of hall sensors, it is disadvantageous in view of the costs.

In particular, in addition to the expensive three-phase driver chip necessarily required for the motor control, since at least six FETs should be provided, it causes the costs to increase.

Further, since the hall sensors are provided on at least three positions, an error possibility will be disadvantageously increased. The reason is that the operation reliability of the hall sensor generating an electric signal is not stable, and the motor does not operate basically at the time of electrical failure.

In the linear type motor, since the thrust is varied by a stroke-based current control using the hall sensor and alternative arrangement of continuous N, S, N and S magnets, as shown in FIG. 8A, cogging torque which is a force such as weak vibration is relatively high.

Therefore, according to the eco pedal employing the linear type motor having the relatively high cogging torque, when a reaction stepping force is created by hysteresis in the eco mode, the relatively high cogging torque deteriorates the driver's pedal feeling over the whole range, which is unfavorable for the pedal feeling.

SUMMARY OF THE INVENTION

An embodiment of the present invention is directed to an active eco pedal apparatus employing a VCM type actuator having a pair of permanent magnets and a pair of coils through which a current flows in opposite directions, in which an additional repulsive force is generated by action of an electric field created by the coils, in addition to a basic moving force, thereby increasing the thrust to push the pedal and thus remarkably improving efficiency of an eco mode.

Another embodiment of the present invention is directed to an active eco pedal apparatus, in which since ON and OFF of a VCM type actuator is controlled in a single-phase manner, without using a hall sensor having high error possibility, it is possible to reduce the number of FETs and to make a compact configuration, and since a relatively inexpensive single-phase driver chip is used, it is possible to reduce its costs.

Further another embodiment of the present invention is directed to an active eco pedal apparatus, in which since cogging torque is not generated by a VCM type actuator which is controlled in a single-phase manner, without using a hall sensor, a driver's pedal feeling is not deteriorated over the whole range when an eco mode is activated, thereby remarkably improving its merchantable quality.

Other objects and advantages of the present invention can be understood by the following description, and will become apparent with reference to the embodiments of the present invention. Also, it will be obvious to those skilled in the art to which the present invention pertains that the objects and advantages of the present invention can be realized by the means as claimed and combinations thereof.

In accordance with an embodiment thereof, the present invention includes an active eco pedal apparatus including a voice coil motor (VCM) including a pair of coils which generate an electric field by a current supplied from an exterior, and are connected to each in series via a middle portion at which the first and second coils are connected to each other to convert a winding direction in an opposite direction; a pair of magnets each having an N-pole and an S-pole interacting with an electric field generated from the pair of coils, in which two different basic moving forces Fa and Fb are created in the same direction by an electromagnetic field generated by action of the N-pole and the S-pole and the electric field, one repulsive force Fc is generated by the same polarity in the electromagnetic field generated by the action of the N-pole and the S-pole and the electric field and the electric field generated when the current flows through the pair of coils in opposite directions, and the one repulsive force Fc is added to the basic moving forces Fa and Pb to increase a magnitude of the basic moving forces Fa and Fb; and a movable member which is moved by the basic moving forces Fa and Fb inside the pair of magnets, in which a first magnet of the pair of magnets which has an N-pole exposed to the first coil and a second magnet which has an S-pole exposed to the second coil are arranged in series.

The pair of coils may be enclosed by an insulator, the insulator may be covered by a stator, the stator may be accommodated in a motor housing, and the movable member may be connected to a push shaft protruding outwardly from the motor housing.

A flow direction of the current supplied to the pair of coils may be varied by a controller which controls an amount of a current supplied to the actuator.

The movable member may be guided by at least one guide pin fixed to the motor housing.

The motor housing may have a front housing and a rear housing which are engaged with each other by a fastening bolt.

In accordance with another embodiment of the present invention, the present invention includes an active eco pedal apparatus including a pedal which is hinged to a vehicle body to be pushed by a driver, the pedal being returned to an initial position by a resilient restoring force when the pushing of the driver is released; an actuator including a voice coil motor (VCM) having a pair of coils which generate an electric field by a current supplied from an exterior, and a pair of magnets each having an N-pole and an S-pole interacting with an electric field generated from the pair of coils, in which two different basic moving forces Fa and Fb are created in the same direction by an electromagnetic field generated by action of the N-pole and the S-pole and the electric field, one repulsive force Fc is generated by the same polarity in the electromagnetic field generated by the action of the N-pole and the S-pole and the electric field and the electric field generated when the current flows through the pair of coils in opposite directions, and the one repulsive force Fc is added to the basic moving forces Fa and Fb to increase a magnitude of the basic moving forces Fa and Fb; and a holder which applies a resilient force to the actuator to restrain unexpected movement of the actuator when an eco mode is not activated.

The actuator may include a stator accommodated in a motor housing and an insulator enclosing the pair of coils received in the stator. The pair of coils arranged in series may include a first coil and a second coil, and the first coil and the second coil may be respectively wound in opposite directions and have a middle portion with which the first and second coils are connected. For a first magnet of the pair of magnets positioned inside the first coil, an N-pole may be exposed to the first coil, while for a second magnet positioned inside the second coil, an S-pole may be exposed to the second coil. A movable member may be positioned inside the first magnet and the second magnet, and may be moved by the basic thrust, and a push shaft may be connected to the movable member to push the pedal in a direction opposite to a pushing direction of the pedal. The movable member may be guided by at least one guide pin, and the guide pin may penetrate through the motor housing and be fixed to the motor housing.

The pedal may be provided with an adjustor, and the adjustor may be moved toward or away from a driver using power of a motor to adjust an interval of the pedal to the driver. A rotary driving cable may be connected to the motor, and may adjust the interval of a brake pedal using the power of the motor, as well as the pedal.

With the above configuration, the present invention can improve the efficiency of the eco mode using the strengthen thrust in comparison with the current supplied to the VCM type actuator. Further, since a hall sensor having high error possibility is not utilized, it is possible to remarkably improve its operation stability in the single-phase control manner and to contribute to improvement of its merchantable quality.

In addition, since the present invention controls the VCM type actuator in the single-phase control manner, the hall sensor can be eliminated, and the number of FETs can be reduced from 6 to 4, thereby ma king a further compact configuration. In particular, since a relatively inexpensive single-phase driver chip is used, it is possible to reduce its costs.

Further, since the present invention does not generate cogging torque with the VCM actuator of a coreless type, it is possible to activate the eco mode without deteriorating a driver's pedal feeling due to the cogging torque which is generated over the whole range, thereby remarkably improving its merchantable quality.

BRIEF DESCRIPTION OF THE DRAWINGS

FIG. 6 is a diagram illustrating a holder for holding an actuator according to the present invention when an eco mode is not activated;

FIG. 7 is a diagram illustration operation of an actuator applying pedal reaction in an active eco pedal apparatus according to the present invention when an eco mode is activated.

DESCRIPTION OF SPECIFIC EMBODIMENTS

Figure 1:
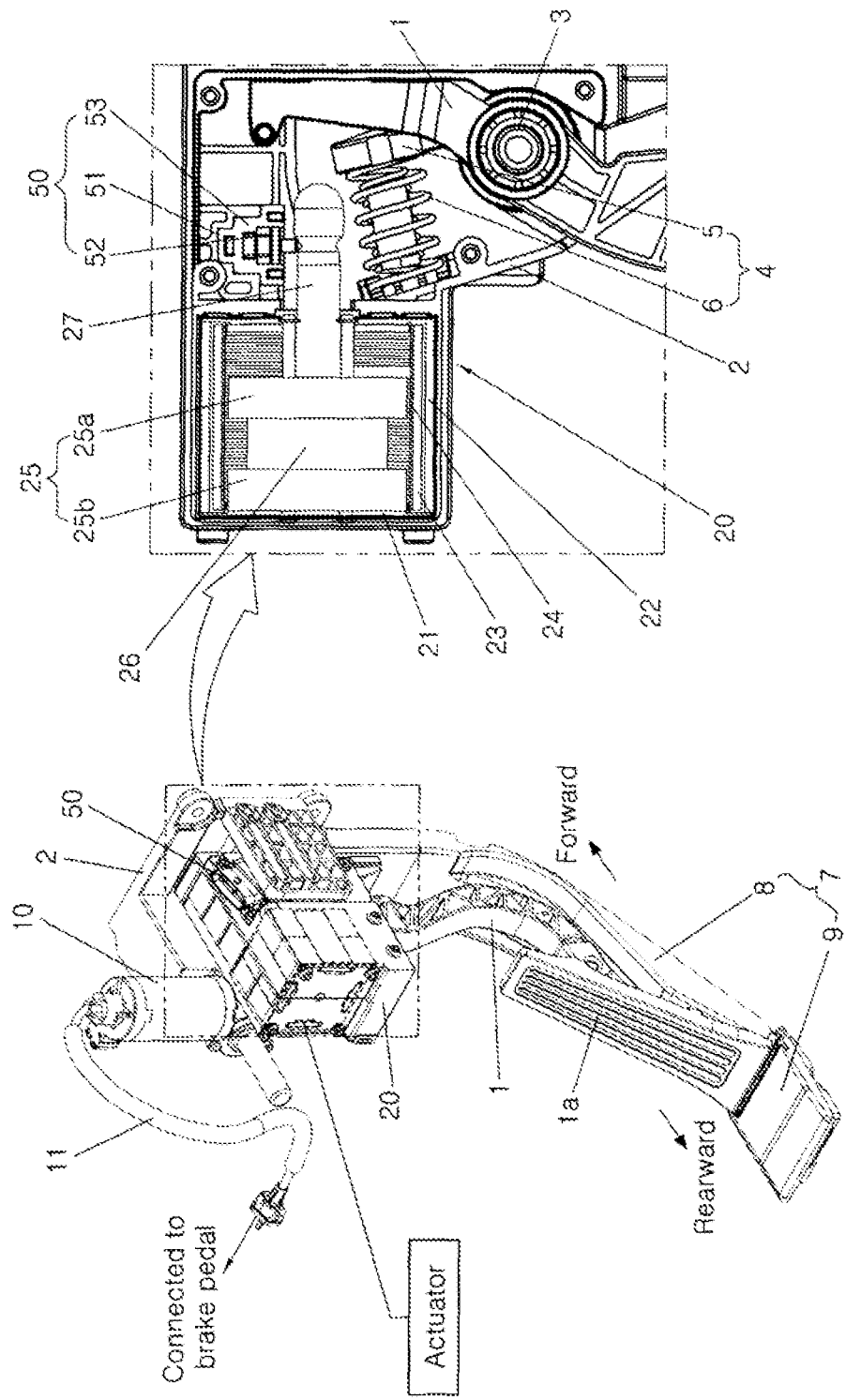
FIG. 1 is a diagram illustrating an active eco pedal apparatus having an actuator according to the present invention.

Exemplary embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a diagram illustrating an active eco pedal apparatus having an actuator according to the present invention.

As shown in FIG. 1, the active eco pedal apparatus includes a pedal 1 having a pedal plate 1a on which a driver steps, an adjustor 7 which is movable toward or away from a driver to adjust an interval of the pedal 1 to the driver, an adjustor motor 10 which is driven by manipulation of a switch to move the adjustor 7, an actuator 20 which applies reaction for pushing the pedal 1 when an eco mode is activated by current control of a controller, and a holder 50 which holds unwanted movement of the actuator 20 when the eco mode is not activated.

In the case in which the active eco pedal apparatus according to the embodiment is provided with the pedal and the adjustor 7 for moving the position of the pedal to the driver, it is referred to as a pendent type pedal. In general, the pendent type pedal can be classified into a pendent type organ pedal, a box type organ pedal, and an eco organ pedal depending upon a method of coupling the pedal 1 and the adjustor 7.

In addition, in the structure utilizing the adjustor motor 10 at the time of positioning the pedal 1 using the adjustor 7 as described above, a rotatable driving cable 11 is connected to an adjacent pedal (for example, a brake pedal) so that the adjacent pedal is moved in conjunction with the motion of the pedal 1, thereby configuring a module unit in which an accelerator pedal is integrally formed with a brake pedal.

The pedal 1 applied to this embodiment is engaged with a pedal housing 2, which is mounted on a vehicle body, via a hinge shaft 3, and has a return member 4 for returning the pedal to its original position at the time of releasing the stepping force from the driver.

The return member 4 has a spring seat 5 interconnected with the motion of the pedal 1, and a return spring 6 for resiliently supporting the spring seat 5 and compressively deformed by the pedal to apply a resilient restoring force to the pedal 1.

A coil spring type is applied as the return spring 6 in this embodiment.

In this embodiment, the adjustor 7 is slid forward and rearward together with the pedal 1 in a state in which an interval between the adjustor and the pedal 1 is maintained so as not to interrupt the motion of the pedal 1 to be stepped. As a result, the interval of the pedal 1 to the driver can be adjusted.

To this end, the adjustor 7 has a slider 8 which is positioned behind the pedal 1 and is moved by the adjustor motor 10, and a guide block 9 which guides sliding movement of the slider 8.

The forward and rearward movement of the slider 8 is carried out by converting rotation of the adjustor motor 10 into straight movement using a worm gear, a worm, and a lead screw, which is commonly applied in the art.

The actuator 20 according to the embodiment employs a voice coil motor (VCM) including permanent magnets positioned inside or outside and coils, in which the coil or permanent magnet is moved by mutual action of a magnetic field generated by the permanent magnets and a magnetic moment generated by the coils, thereby producing thrust.

However, the VCM applied to this embodiment utilizes synergy action, in which a separate repulsive force is added to the basic thrust generated by at least two permanent magnets and two coils arranged in series in the thrust direction, thereby remarkably increasing the thrust in proportion to the supplied current and thus reliably and effectively implementing the eco mode.

To this end, the actuator 20 includes a stator 22 received in the motor housing 21, a VCM having a pair of coils 24 arranged identically in the thrust direction and a pair of magnets 25 forming an electromagnetic field, and a movable member 26 moved by thrust to allow a push shaft 27 to push the pedal 1.

Figure 2:
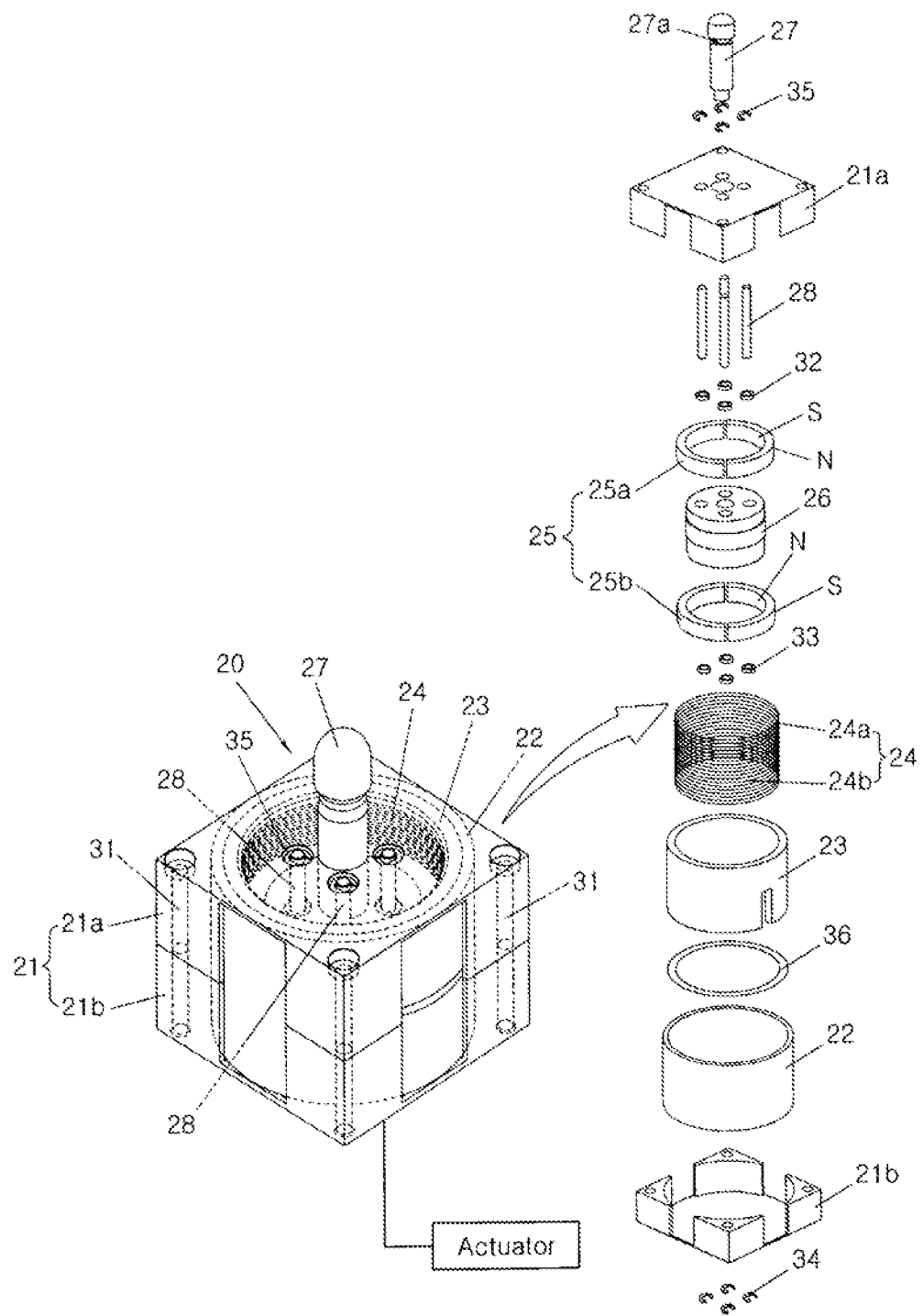
FIG. 2 is an exploded perspective view of an actuator according to the present invention.

FIG. 2 is an exploded perspective view of the actuator 20 according to this embodiment.

As shown in FIG. 2, the motor housing 21 has a front housing 21a and a rear housing 21b which are fastened to each other by fastening bolts 31. All components configuring the actuator 20 are positioned and assembled in the space formed by the front housing 21a and the rear housing 21b.

The stator 22 is located at the outermost position of the space formed by the front housing 21a and the rear housing 21b, and an insulator 23 is positioned inside the stator 22. The VCM supplied by a current under the control of the controller is positioned inside the insulator 23, and the movable member 26 moved by the thrust from the VCM is positioned inside the VCM. The movable member is connected to a push shaft 27 protruding from the motor housing 21.

A cover ring 36 is further provided between the stator 22 and the insulator 23.

The VCM includes at least two pairs of coils 24 along which the current supplied from the VCM flows in different directions, and a pair of magnets 25 made of the same number as the coils 24 and positioned inside the coils 24.

The coil 24 has a first coil 24a and a second coil 24b which are wound in a circular shape, and the current flows through the first and second coils. The first coil 24a and the second coil 24b are arranged in series in the thrust direction which is a moving direction of the push shaft.

The magnet 25 has a first ring-type hollow magnet 25a and a second ring-type hollow magnet 25b which are respectively made of a permanent magnet having an N-pole and an S-pole. The first magnet 25a is positioned inside the first coil 24a, and the second magnet 25b is positioned inside the second coil 24b, so that the first and second magnets are arranged in series in the thrust direction which is the moving direction of the push shaft 27.

In this instance, the first magnet 25a has the N-pole formed on the outside and the S-pole formed on the inside, while the second magnet 25b has the S-pole formed on the outside and the N-pole formed on the inside.

In addition, the movable member 26 is connected to a guide pin 28 such that the movable member is guided when the movable member is moved by the thrust from the VCM. To this end, the guide pin 28 penetrates through the movable member 26, and both end portions of the guide pin are respectively fixed to the font housing 21a and the rear housing 21b.

At least one guide pin 28 is provided, while in this embodiment a group of four guide pins which are arranged at an interval of 90 degrees is provided to further reliably move the movable member by the thrust generated from the VCM.

Bushes 32 and 33 are respectively provided on front and rear portions of the movable member 26 through which the guide pin 28 penetrates.

Further, in order to strengthen the waterproof performance of the actuator 20, a bush 34 is provided to the rear housing 21b to which the guide pin 28 is fixed, and an E-ring 35 is provided to the front housing 21a.

Figure 3:
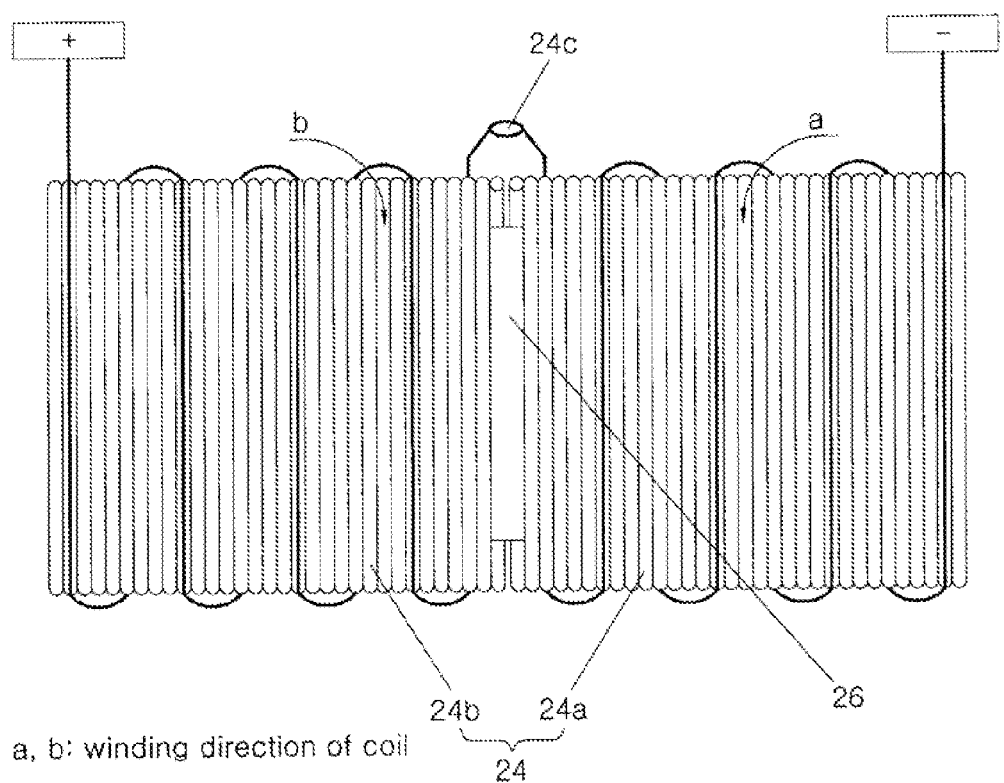
FIG. 3 is a diagram illustrating a voice coil motor (VCM) according to the present invention.

FIG. 3 is a diagram illustrating the voice coil motor (VCM) according to this embodiment.

As shown in the figure, the VCM includes the movable member 26 for moving the push shaft 27, the pair of first magnet 25a and second magnet 25b which receive the movable member 26 therein, and the first coil 24a and the second coil 24b each wound around the first and second magnets. The first coil 24a and the second coil 24b are wound in an opposite direction.

For example, if the first coil 24a is wound around the first magnet 25a in a counterclockwise direction a, the second coil 24b is wound around the second magnet 25b in a clockwise direction b. A coil twisted portion 24c for converting the direction is formed at a middle portion in which the first coil 24a is connected to the second coil 24b.

Figure 4A:
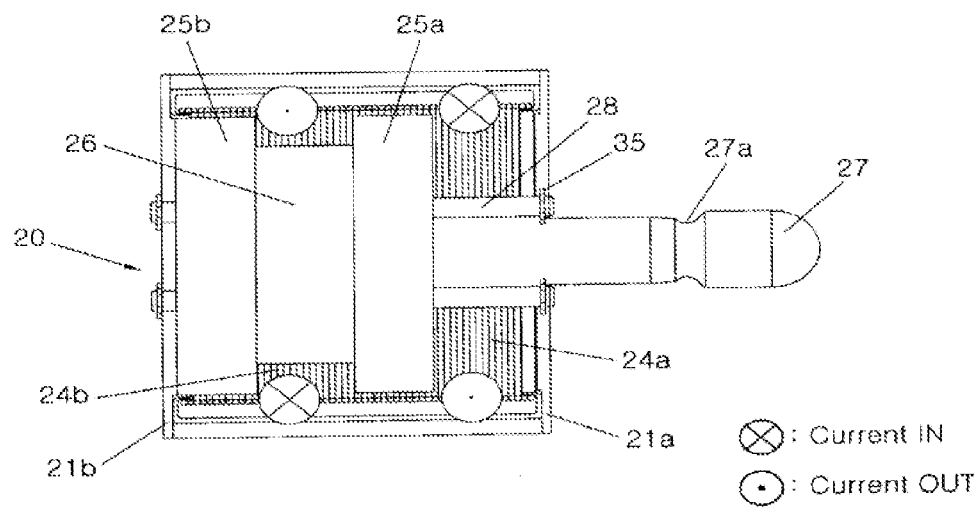
FIGS. 4A and 4B are a cross-sectional view and a perspective view illustrating an actuator according to the present invention, respectively.
Figure 4B:
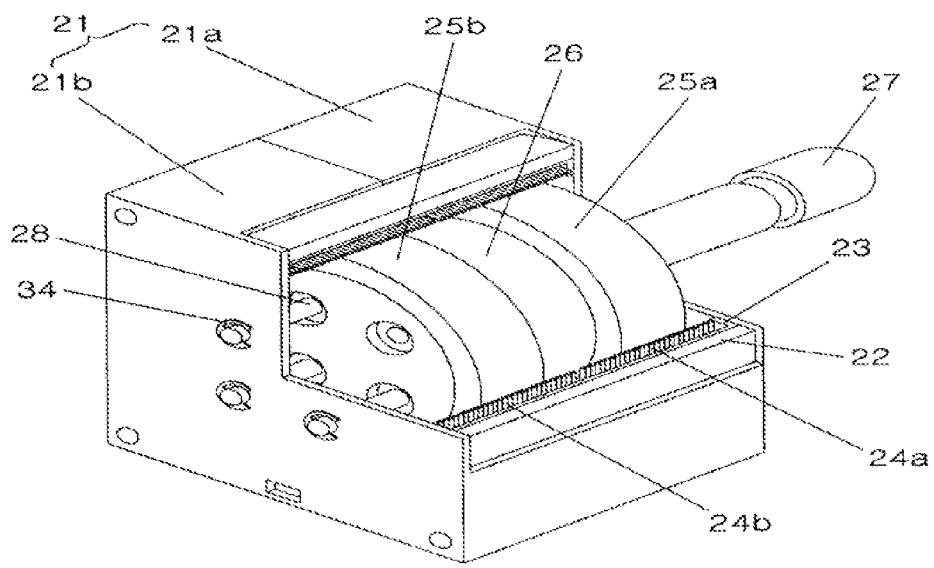

FIGS. 4A and 4B show the assembled state of the actuator according to this embodiment. If the actuator 20 is assembled as illustrated in FIG. 4A, the movable member 26 is engaged with the guide pin 28, and is positioned inside the VCM. The push shaft 27 has one end fixed to the movable member 26 and the other end protruding outwardly from the motor housing 21, so that the push shaft can be moved with the movable member 26.

If the actuator 20 is assembled as illustrated in FIG. 4B, the VCM serving as a power source is accommodated in the motor housing 21, with the actuator being insulated by the insulator 23. The motor housing 21 has the front housing 21a and the rear housing 21b which are engaged with each other by the fastening bolts, so that the assembling and disassembling work is convenient to improve the workability.

Although not shown in the accompanying drawings, the VCM type actuator 20 according to this embodiment is turned on and off in a single-phase control manner, so that a single-phase driver chip which is a relatively inexpensive chip can be applied. The number of field effect transistors (FET) for detecting overload of the current applied to the motor can be remarkably reduced. In particular, a hall sensor for detecting stroke of the motor is not utilized.

If the hall sensor is not utilized to control the motor, it is possible to remarkably decrease the error possibility of actuator due to electrical failures, so that the VCM type actuator 20 can improve the stability and reliability in operation as compared with a linear type motor according to a related art.

Figure 5:
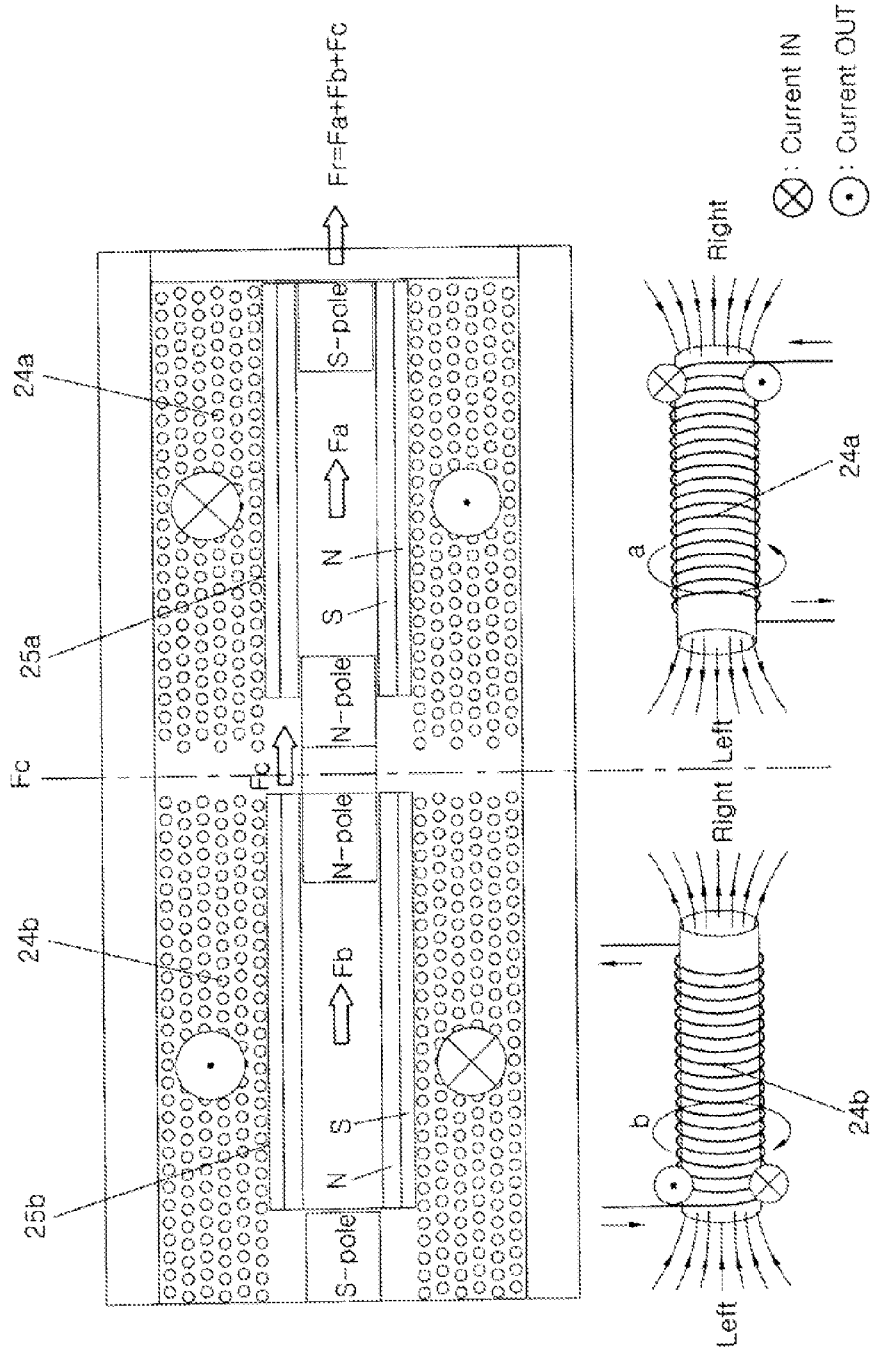
FIG. 5 is a diagram illustrating an operation principle of a voice coil motor (VCM) according to the present invention.

FIG. 5 is a diagram illustrating an operation principle of the voice coil motor (VCM) according to this embodiment when the current is applied to the VCM.

As shown in FIG. 5, if the current is applied to the coil 24, basic moving forces Fa and Fb are respectively generated from the first magnet 25a wound with the first coil 24a and the second magnet 25b wound with the second coil 24b to push the movable member 26 in the moving direction of the push shaft 27.

In this embodiment, however, strong repulsive force Fc is further generated to push the movable member 26, in addition to the basic moving forces Fa and Fb. This is caused by the structural feature of the VCM in which the current applied to the first coil 24a and the second coil 24b flows in opposite directions.

That is, the current flowing through the first magnet 25a with the N-pole formed on the outside and the S-pole formed on the inside in the counterclockwise direction a generates the electromagnetic field flowing from the right to the left, while the current flowing through the second magnet 25b with the S-pole formed on the inside and the N-pole formed on the outside in the clockwise direction b generates the electromagnetic field flowing from the left to the right.

With the above-described flow of the electromagnetic field, the S-pole is formed at the portions, in which the electromagnetic field comes, of the first coil 24a and the first magnet 25a, while the N-pole is formed at the portions, from which the electromagnetic field exits, of the first coil 24a and the first magnet 25a. In addition, the S-pole is formed at the portions, in which the electromagnetic field comes, of the second coil 24b and the second magnet 25b, while the N-pole is formed at the portions, from which the electromagnetic field exits, of the second coil 24b and the second magnet 25b.

As a result, the repulsive force Fc is generated at the portion, in which the first coil 24a faces the second coil 24b, by the same N-pole, and serves as a force to push the movable member 26 in the moving direction of the push shaft 27.

Therefore, the movable member 26 is pushed by the thrust force (Fr=Fa+Fb+Fc) which is a resultant force of the moving forces Fa and Fb and the repulsive force Fc. The push shaft 27 fixed to the movable member 26 is pushed toward the pedal 1 by the thrust Fr, thereby activating the eco mode in which reaction is applied to the pedal 1 stepped by the driver.

In general, the moving direction of the thrust force Fr is converted in an opposite direction by reversing the direction of the current applied to the VCM. The controller controls the current flow in the first coil 24a and the second coil 24b, respectively, so that the direction of the current flowing through the first coil 24a and the second coil 24b can be identical to each other.

If the thrust Fr is utilized as described in this embodiment, it is possible to raise the specification of the eco pedal of which the performance of the eco mode is increased in comparison with the supplied power, or to further effectively achieve the operation of the eco pedal having the same performance.

FIG. 6 is a diagram illustrating the holder 50 for restraining the movement of the actuator according to this embodiment when the eco mode is not activated.

As shown in FIG. 6, the holder 50 includes a case 51 provided in the moving path of the push shaft 27 inside the pedal housing 2, and a holder pin 52 resiliently supported by the resilient member 53 in the case 51 to press a locking groove 27a formed along the circumference of the push shaft 27.

The resilient member 53 has elastic modulus lower than the thrust Fr for moving the push shaft 27 when the actuator 20 is operated. The resilient member 53 has a common coil spring.

FIG. 7 is a diagram illustration the operation of the actuator which applies the pedal reaction in the active eco pedal apparatus according to this embodiment when the eco mode is activated.

As shown in FIG. 7, the actuator 20 is controlled by the controller, and the controller controls an amount of current supplied to the VCM when the actuator 20 is operated. An engine control unit (ECU) is generally applied.

The ECU receives signals from various sensors which can detect frequent manipulation or abrupt manipulation of the pedal 1 which has an effect on the fuel efficiency, or driving conditions (lane deviation, dangerous vehicle interval, dangerous curved driving, or the like) of the vehicle to determine whether the actuator 20 operates or not.

If the driver steps on the pedal 1 when the vehicle is driving, the pedal 1 is pushed toward the actuator 20 in such a way that one portion which is lower than the hinge shaft 3 of the pedal housing 2 is pressed (indicated by Pa in FIG. 7) by the driver while the other portion which is upper than the hinge shaft is rotated (indicated by Ma in FIG. 7) around the hinge shaft 3.

When the eco mode is activated in this state, the strong thrust Fr is generated by the action of the electric field created in the VCM which is supplied by the current under the control of the controller. The strong repulsive force Fc is applied to the movable member 26 to which the basic moving forces Fa and Fb are applied. Since all forces are combined to form the thrust force (Fr=Fa+Fb+Fc), the push shaft 27 pushed by the movable member 26 supplies the strong repulsive force to the pedal 1.

This is caused by the structural feature of the VCM including the pair of first and second coils 24a and 24b in which the current flows in opposite directions, and the pair of first and second magnets 25a and 25b generating the repulsive force.

In this instance, the push shaft 27 pushed toward the pedal 1 is resisted by the holder pin 52, but the thrust Fr pushing the push shaft 27 toward the pedal 1 is stronger than the resilient force of the resilient member 58 pressing the holder pin 52. As a result, the movement of the push shaft 27 is not limited.

When the push shaft 27 again pushes the pedal 1 by the strong thrust Fr, the pedal 1 is reversely rotated (indicated by Mb in FIG. 7) around the hinge shaft 3. As a result, the upper portion of the pedal 1 is moved away from the actuator 20, while the lower portion of the pedal 1 applies the reaction Pb to the driver.

Therefore, the driver feels the reaction Pb transferred from the pedal 1 in the state in which the driver is stepping on the pedal, regardless of driver's will, and thus the driver can stop manipulating the pedal 1. Since the number of unnecessary pedal manipulation performed by the behavior of the driver can be remarkably reduced, thereby improving the fuel efficiency.

This eco mode can increase a recognition rate of the driver by intermittently applying the reaction Pb to the pedal 1 through the actuator 20. The controller reverses the direction of the current supplied to the actuator 20 to achieve this function.

That is, if a current supply direction in which the push shaft 27 is moved out of the actuator 20 to push the pedal 1 is defined as a forward direction, and a current supply direction in which the push shaft 27 enters the actuator 20 not to push the pedal 1 is defined as a reverse direction, the direction of the current supplied to the actuator 20 is repeated in the forward direction and the reverse direction by the controller. As a result, the eco mode can be easily achieved.

The control of the actuator 20 by the controller means that various modes, such as a vibration mode, can be achieved by a control logic of the controller in this embodiment, in addition to the eco mode.

In particular, if the controller controls ON and OFF of the VCM type actuator 20 in the single-phase control manner, as described in this embodiment, the control logic of the controller can be extremely simplified even when the eco mode or other additional modes are achieved using the actuator 20, which can remarkably improve a design efficiency.

With the eco pedal apparatus employing the VCM type actuator can remarkably improve the satisfaction of the driver and the merchantable quality, without deteriorating the driver's pedal feeling due to cogging torque.

Figure 8A:
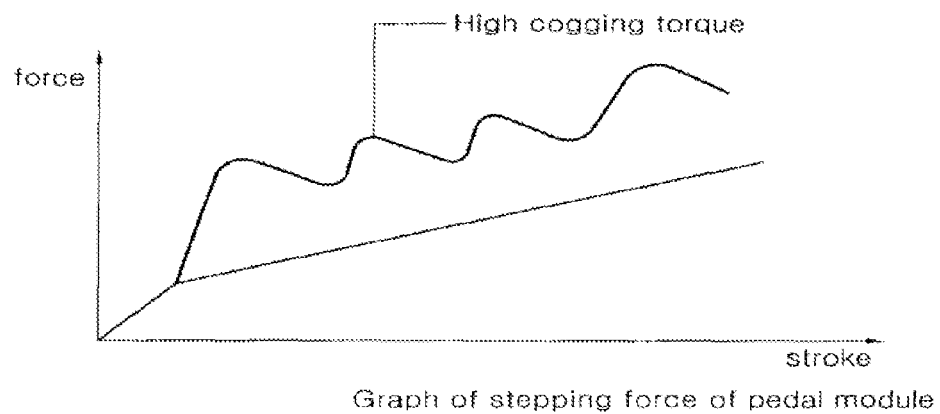
FIGS. 8A and 8B are graphs of a stepping force to show a difference between driver's pedal feeling caused by cogging torque in accordance with types of actuators when an eco mode is activated.
Figure 8B:
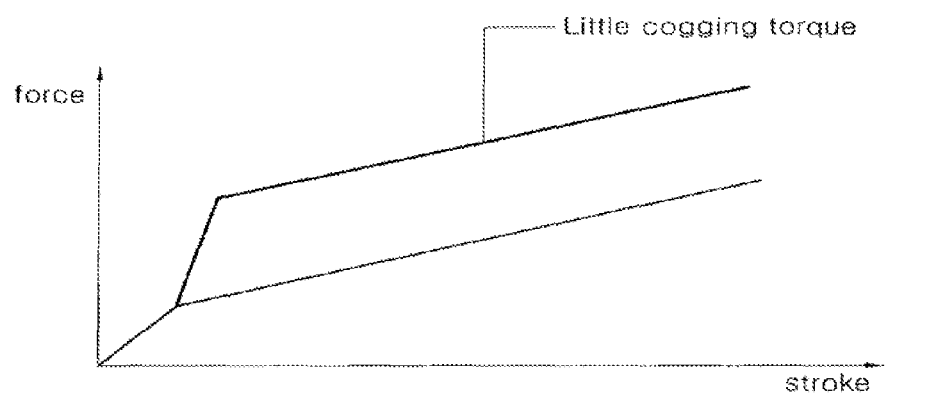

FIGS. 8A and 8B are graphs of a stepping force of the pedal to show a difference between driver's pedal feeling generated by the cogging torque in accordance with a type of the actuator when the eco mode is activated.

FIG. 8A shows that when the eco mode is activated in a three-phase control manner by a linear type motor of the related art to generate a reaction stepping force from hysteresis, relatively high cogging torque deteriorates the driver's pedal feeling over the whole range. As described and shown in this embodiment, however, FIG. 8B shows that when the eco mode is activated in the single-phase control manner by the VCM type actuator 20 to generate a reaction stepping force from hysteresis, little cogging torque is generated.

As shown in FIGS. 8A and 8B, the VCM type actuator 20 can remarkably improve the driver's pedal feeling over the whole range, without generating the cogging torque, even though the eco mode is activated.

As described above, the actuator 20 applied to the active eco pedal apparatus according to this embodiment includes the VCM having the pair of first and second coils 24a and 24b through which the current flows in opposite directions, and the pair of first and second magnets 25a and 25b interacting with the electric field generated by the pair of the first and second coils. The additional repulsive force Fc is generated from the VCM supplied by the current, in addition to the basic moving forces Fa and Fb, thereby increasing the thrust force Fr to push the pedal 1 and thus remarkably improving the efficiency of the eco mode. In particular, since the actuator is controlled in the single-phase manner by the single-phase driver chip without using a hall sensor having high error possibility, it is possible to improve the reliability of the operation and the merchantable quality. In addition, since the number of FETs is reduced, the system is configured to have a compact size, and costs are lowered.

While the present invention has been described with respect to the specific embodiments, it will be apparent to those skilled in the art that various changes and modifications may be made without departing from the spirit and scope of the invention as defined in the following claims.

What is claimed is:

1. An active eco pedal apparatus comprising:
a pedal which is hinged to a vehicle body to be pushed by a driver, the pedal being returned to an initial position by a resilient restoring force when the pushing of the driver is released;
an actuator including a voice coil motor (VCM) having a pair of coils which generate an electric field by a current supplied from an exterior, and a pair of magnets each having an N-pole and an S-pole interacting with an electric field generated from the pair of coils, in which two different basic moving forces Fa and Fb are created in the same direction by an electromagnetic field generated by action of the N-pole and the S-pole and the electric field, one repulsive force Fc is generated by the same polarity in the electromagnetic field generated by the action of the N-pole and the S-pole and the electric field and the electric field generated when the current flows through the pair of coils in opposite directions, and the one repulsive force Fc is added to the basic moving forces Fa and Fb to increase a magnitude of the basic moving forces Fa and Fb; and
a holder which applies a resilient force to the actuator to restrain unexpected movement of the actuator when an eco mode is not activated,
wherein the pedal is provided with an adjustor, and the adjustor is moved toward or away from a driver using power of a motor to adjust an interval of the pedal to the driver; and a rotary driving cable is connected to the motor, and adjusts the interval of a brake pedal using the power of the motor, as well as the pedal.

2. The active eco pedal apparatus of claim 1, wherein the actuator includes a stator accommodated in a motor housing and an insulator enclosing the pair of coils received in the stator;

the pair of coils arranged in series includes a first coil and a second coil, and the first coil and the second coil are respectively wound in opposite directions and have a middle portion with which the first and second coils are connected;

a first magnet of the pair of magnets positioned inside the first coil has an N-pole exposed to the first coil, and a second magnet positioned inside the second coil has an S-pole exposed to the second coil;

a movable member is positioned inside the first magnet and the second magnet, and is moved by the basic thrust, and a push shaft is connected to the movable member to push the pedal in a direction opposite to a pushing direction of the pedal; and the movable member is guided by at least one guide pin, and the guide penetrates through the motor housing and is fixed to the motor housing.

\* \* \* \* \*